Sept. 26, 1944.   J. L. SCHEER   2,359,249
WORK SUPPORT
Filed Nov. 17, 1943   2 Sheets-Sheet 1
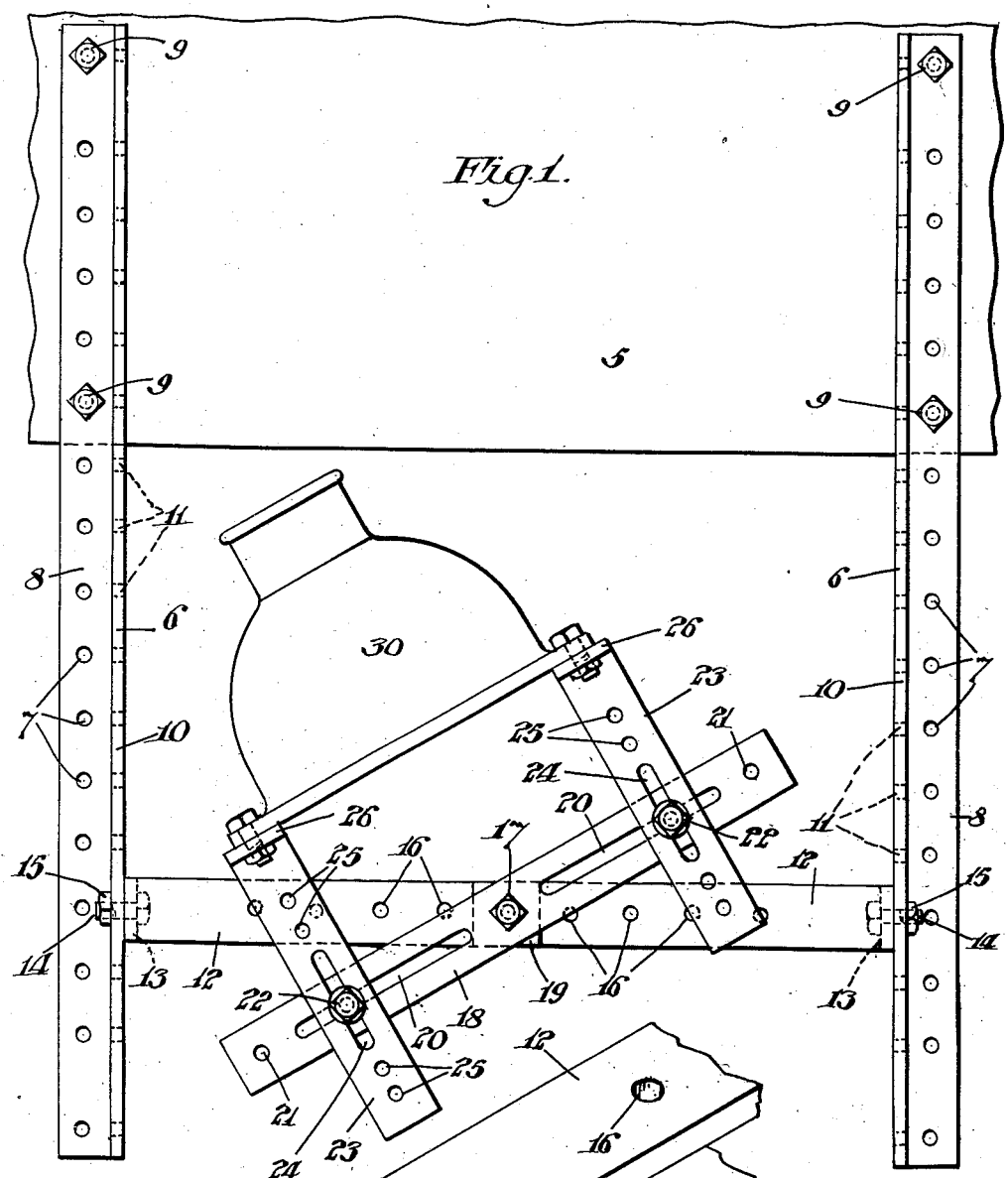
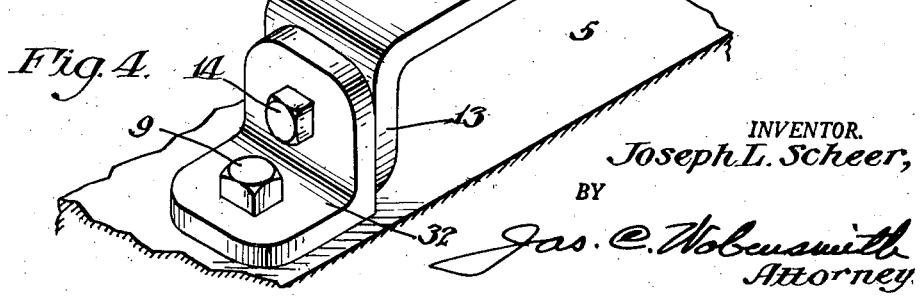
INVENTOR.
Joseph L. Scheer,
BY
Jas. C. Wobensmith
Attorney.

Sept. 26, 1944.   J. L. SCHEER   2,359,249
WORK SUPPORT
Filed Nov. 17, 1943   2 Sheets-Sheet 2

INVENTOR.
Joseph L. Scheer,
BY
Jas. @. Hobensmith
Attorney.

Patented Sept. 26, 1944

2,359,249

UNITED STATES PATENT OFFICE 2,359,249

WORK SUPPORT

Joseph L. Scheer, Cynwyd, Pa.

Application November 17, 1943, Serial No. 510,601

2 Claims. (Cl. 29—284)

The principal object of the present invention is to provide a work support by means of which pieces upon which various operations are to be performed may be readily mounted and held in fixed positions, the device being so constructed and arranged that the article to be operated on may be readily shifted from one desired position to another.

With the foregoing objects in view, my invention contemplates apparatus which will be relatively inexpensive in its construction, and which may be used in connection with a primary support, as, for example, an ordinary work shop bench.

The nature and characteristic features of the invention will be more readily understood from the following description, taken in connection with the accompanying drawings forming part hereof, in which:

Figure 1 is a top plan view of apparatus embodying the principal features of the present invention, the same being shown mounted on a portion of a work bench and having an article supported in an angular position;

Fig. 4 is a perspective view, enlarged, of a modified form of means for attaching the apparatus to the work bench.

Figure 2:
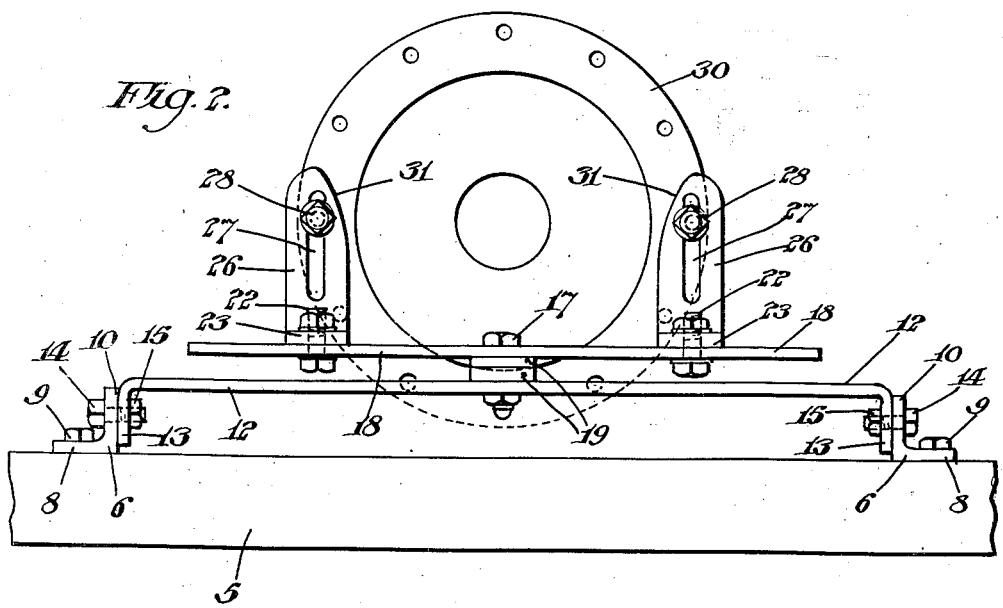
Fig. 2 is a front elevation of the apparatus shown in Fig. 1, but with the article being supported brought to a position with its principal axis disposed at right angles to the plane of vision.

It should, of course, be understood that the description and drawings herein are illustrative merely, and that various modifications and changes may be made in the structure disclosed without departing from the spirit of the invention.

Referring to the drawings, in the particular embodiment of my invention therein shown, 5 is the top section of an ordinary work shop bench, the same constituting in this instance the primary support to which the apparatus of the present invention is secured.

Secured to the top 5 of the bench are structural angle bars 6, each provided with a plurality of spaced apertures or bolt holes 7 extending through the horizontal flanges 8 of each of the angle bars 6. The angle bars 6 may be secured to the top 5 of the bench by means of lag screws or bolts 9.

The vertical flanges 10 of the angle bars 6 are also provided with bolt holes 11 for mounting a transverse bar member 12 having depending ears 13, suitably apertured for the passage therethrough of bolts 14 by means of which said bar 12 is secured at the desired location to the angle bars 6. By the foregoing arrangement the bar 12 may not only be secured at various locations along the lengths of the angle bars 6 by passing the bolts 14 through the desired bolt holes 11 in the vertical flanges 10 of said angle bars 6, but also by loosening the nuts 15 on the bolts 14, the bar 12 may be shifted to desired angular positions about the axis provided by the bolts 14.

The bar 12 is provided along its length with a series of spaced apertures 16, for the passage therethrough of a bolt 17 by means of which a bar member 18 may be pivotally mounted with respect to the bar 12 in such manner as to be rotatable in a plane parallel to the plane of the body portion of the bar 12. Preferably there are provided apertured spacing blocks 19 disposed between the bar 12 and the bar 18.

The bar 18 is provided with slots 20, and apertures 21, for the passage therethrough of bolts 22 by means of which bars 23 are secured to the bar 18. The bars 23 are likewise provided with slots 24, and apertures 25, whereby the same may be secured to the bar 18, by the bolts 22, in a wide variety of locations and positions.

The bars 23 are each provided with an angular extension 26. The extensions 26 are each provided with a slot 27, for the passage therethrough of bolts 28 by means of which the work piece 30 may be secured thereto. It should be noted that the ends of the angular extensions 26 are peculiarly shaped, the margin 31 on one side being defined by a curve of relatively large radius, and the slot 26 extends in close proximity to said margin 31 thereby permitting the articles to be worked upon to be secured to the angular extensions 26 but which otherwise could not be attached thereto.

Figure 3:
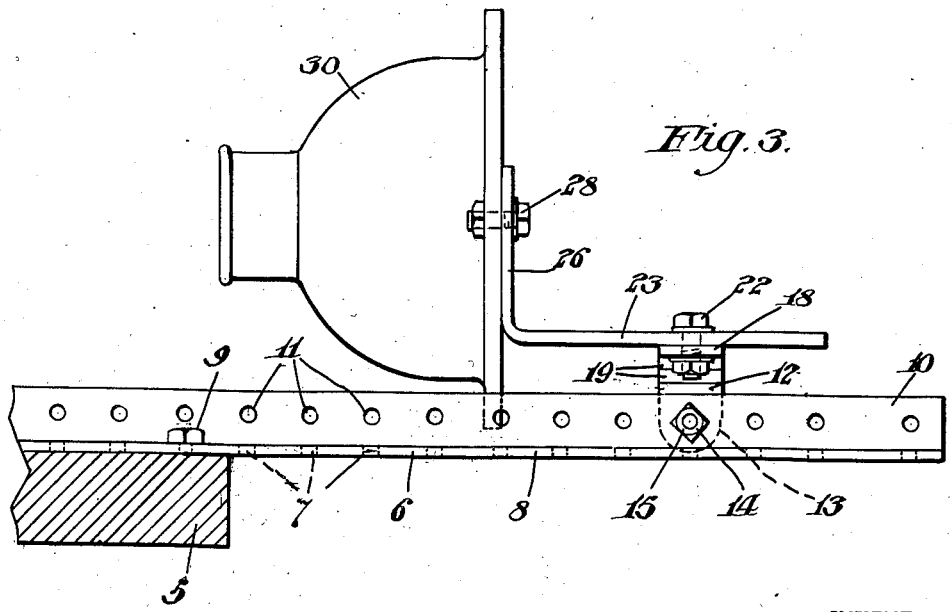
Fig. 3 is a side elevation of the apparatus as shown in Fig. 2, the top of the bench upon which the same is mounted being shown in section.

In Fig. 4 of the drawings there is shown a modified arrangement in which the bar member 12 is secured to the top 5 of the bench by means of angle brackets 32 in lieu of the angle bars 6 shown in Figs. 1, 2 and 3 of the drawings.

The use of the foregoing apparatus permits an article, upon which various operations are to be performed, to be firmly and rigidly held in various desired positions, and also permits the ready shifting of the same from one desired position to another from time to time as the operator may desire. In this manner the various operations to be performed are greatly facilitated and a considerable saving of time and labor is effected. The apparatus of the present invention is adapted for holding a wide variety of work pieces which cannot be conveniently held by the apparatus now available, and it has been found exceedingly useful, not only for shop operations, but also for use in the field, as the same may be readily attached to various types of primary support as the same may be available in various places.

I claim:

1. A work support comprising a fixed primary supporting structure, angle bar members secured thereto, a bar member mounted thereon at selective locations and adjustable with respect thereto about a horizontal pivotal axis, another bar member mounted on the aforesaid bar member at selective locations and adjustably connected thereto on a pivotal axis at right angles thereto, and members adjustably mounted on said last mentioned bar member and having angular extensions to which a work piece may be secured at desired selective locations and positions.

2. A work support comprising a fixed primary supporting structure, angle bar members secured thereto and having portions extending beyond said primary supporting structure, a bar member mounted on the projecting portions of said angle bar members at selective locations and adjustable with respect thereto about a horizontal pivotal axis, another bar member mounted on the aforesaid bar member at selective locations and adjustably connected thereto on a pivotal axis at right angles thereto, and members adjustably mounted on said last mentioned bar member and having angular extensions to which a work piece may be secured at desired selective locations.

JOSEPH L. SCHEER.